(12) United States Patent
Takeuchi

(10) Patent No.: US 8,212,888 B2
(45) Date of Patent: Jul. 3, 2012

(54) IMAGE PICKUP APPARATUS WITH WHITE BALANCE EXTRACTION

(75) Inventor: Yoshitaka Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/912,184

(22) Filed: Oct. 26, 2010

(65) Prior Publication Data
US 2011/0037872 A1     Feb. 17, 2011

Related U.S. Application Data

(60) Continuation of application No. 12/118,434, filed on May 9, 2008, which is a continuation of application No. 11/495,647, filed on Jul. 31, 2006, now Pat. No. 7,385,633, which is a division of application No. 09/978,579, filed on Oct. 18, 2001, now Pat. No. 7,133,071.

(30) Foreign Application Priority Data

Oct. 19, 2000   (JP) ................................ 2000-319718

(51) Int. Cl.
*H04N 9/73*     (2006.01)
*H04N 9/79*     (2006.01)

(52) U.S. Cl. .................. 348/223.1; 348/231.6

(58) Field of Classification Search ........... 348/223.1, 348/231.6, 231.3, 224.1, 225.1; 382/167; 358/523, 518, 516; 399/39
See application file for complete search history.

(56) References Cited

U.S. PATENT DOCUMENTS

| | | | |
|---|---|---|---|
| 4,574,319 A | 3/1986 | Konishi | 348/231.6 |
| 4,734,762 A | 3/1988 | Aoki et al. | 348/223.1 |
| 4,829,379 A | 5/1989 | Takaki | 348/251 |
| 4,945,405 A | 7/1990 | Hirota | 358/516 |
| 5,092,331 A | 3/1992 | Nakamura et al. | 600/342 |
| 5,285,294 A | 2/1994 | Takeuchi | 358/474 |
| 5,311,015 A | 5/1994 | Takeuchi | 250/234 |
| 5,517,236 A | 5/1996 | Sergeant et al. | 348/211.99 |
| 5,818,525 A | 10/1998 | Elabd | 348/268 |
| 6,075,563 A | 6/2000 | Hung | 348/223.1 |
| 6,191,873 B1 | 2/2001 | Mizoguchi et al. | 358/516 |
| 6,320,980 B1 | 11/2001 | Hidaka | 382/167 |

(Continued)

FOREIGN PATENT DOCUMENTS
EP       862335       9/1998

(Continued)

OTHER PUBLICATIONS

Notification of Reasons for Refusal from corresponding Japanese Application No. 2002-319718, dated Sep. 14, 2010, and excerpt English language translation thereof.

*Primary Examiner* — Jason Whipkey
(74) *Attorney, Agent, or Firm* — Fitzpatrick, Cella, Harper & Scinto

(57) ABSTRACT

An image pickup apparatus which can improve convenience of white sheet data used for correcting the color of a picked-up image. Each image pickup data is converted into a file by an image filing unit and recorded by a medium-recording unit. Average value data of each color component data for part of the picked-up data is stored in an area different from the image pickup data recording area in each file.

9 Claims, 9 Drawing Sheets

U.S. PATENT DOCUMENTS

| | | | |
|---|---|---|---|
| 6,504,952 B1 | 1/2003 | Takemura et al. | 382/167 |
| 6,505,002 B2 | 1/2003 | Fields | 396/155 |
| 6,515,698 B1 | 2/2003 | Sasaki et al. | 348/231.6 |
| 6,563,602 B1 | 5/2003 | Uratani et al. | 382/162 |
| 6,567,189 B1 | 5/2003 | Takayama et al. | 358/474 |
| 6,606,117 B1 | 8/2003 | Windle | 348/231.6 |
| 6,636,260 B2 | 10/2003 | Kiyokawa | 348/222.1 |
| 6,642,962 B1 | 11/2003 | Lin et al. | 348/223.1 |
| 6,650,365 B1 | 11/2003 | Sato | 348/231.3 |
| 6,661,538 B1 | 12/2003 | Takeuchi | 358/474 |
| 6,774,938 B1 | 8/2004 | Noguchi | 348/225.1 |
| 6,850,271 B1 | 2/2005 | Ichikawa | 348/223.1 |
| 6,862,040 B1 | 3/2005 | Sawachi | 348/231.3 |
| 6,879,728 B1 | 4/2005 | Fisher et al. | 382/167 |
| 6,965,405 B1 | 11/2005 | Ogino et al. | 348/231.7 |
| 6,985,269 B1 | 1/2006 | Takeuchi | 358/474 |
| 7,009,640 B1 | 3/2006 | Ishii et al. | 348/223.1 |
| 7,020,331 B2 | 3/2006 | Saikawa et al. | 382/167 |
| 7,170,552 B2 | 1/2007 | Parulski et al. | 348/231.3 |
| 7,251,362 B2 | 7/2007 | Osawa et al. | 382/167 |
| 7,385,633 B2 | 6/2008 | Takeuchi | 348/223.1 |
| 2001/0041056 A1 | 11/2001 | Tanaka et al. | 348/232 |
| 2002/0030746 A1 | 3/2002 | Shibutani | 348/207 |
| 2002/0109783 A1 | 8/2002 | Hayashi et al. | 348/333.05 |
| 2002/0113881 A1 | 8/2002 | Funston et al. | 348/223.1 |
| 2002/0118967 A1 | 8/2002 | Funston | 396/155 |
| 2002/0130959 A1 | 9/2002 | McGarvey | 348/223.1 |
| 2003/0095193 A1 | 5/2003 | May et al. | 348/231.3 |
| 2003/0179297 A1 | 9/2003 | Parulski et al. | 348/207.2 |
| 2004/0246359 A1 | 12/2004 | Ogino et al. | 348/333.01 |

FOREIGN PATENT DOCUMENTS

| | | | |
|---|---|---|---|
| JP | 5-260364 | | 10/1993 |
| JP | 6-197371 | | 7/1994 |
| JP | 7-184154 | | 7/1995 |
| JP | 8-088790 | | 4/1996 |
| JP | 08088790 A | * | 4/1996 |
| JP | 10-243414 | | 9/1998 |
| JP | 11-262021 | | 9/1999 |
| JP | 2000-152270 | | 5/2000 |
| JP | 2000-184381 | | 6/2000 |
| JP | 2000-354255 | | 12/2000 |

* cited by examiner

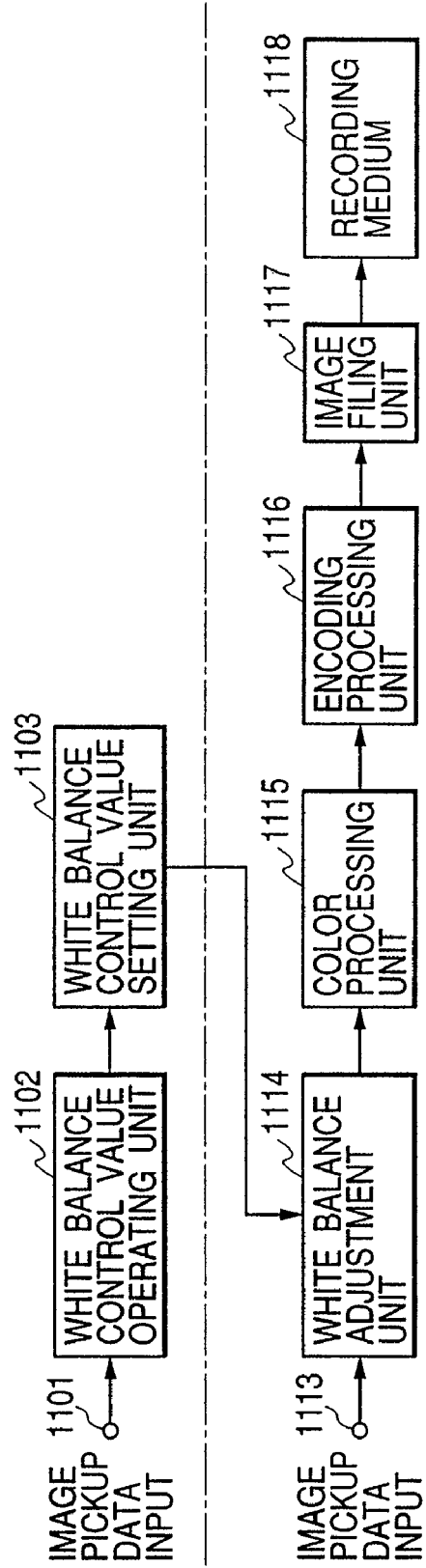

IMAGE PICKUP APPARATUS WITH WHITE BALANCE EXTRACTION

This application is a continuation of U.S. Application Ser. No. 12/118,434, filed May 9, 2008 (pending), which was a continuation of U.S. application Ser. No. 11/495,647, filed Jul. 31, 2006 (now U.S. Pat. No. 7,385,633 issued on Jun. 10, 2008), which was a division of U.S. application Ser. No. 09/978,579, filed Oct. 18, 2001 (now U.S. Pat. No. 7,133,071 issued on Nov. 7, 2006), which are incorporated by reference herein in their entirety, as if fully set forth herein, and claim the benefit of priority under 35 U.S.C. §119, based on Japanese Priority Application No. JP 2000-319718, filed Oct. 19, 2000, which is incorporated by reference herein in its entirety, as if fully set forth herein.

BACKGROUND OF THE INVENTION

1. Field of the Invention

The present invention relates to an image pickup apparatus for adjusting tone of image data picked up by an image pickup element having a plurality of color filters.

2. Related Background Art

To output image data picked up by an image pickup element having a plurality of color filters, the color temperature of a light source in the picked-up image, and the picked-up image data undergoes white balance adjustment, thereby performing faithful color reproduction of the picked-up image.

The white balance adjustment methods include a method of determining the color temperature of a light source using a calorimetric element and a method of searching for an achromatic portion in the picked-up image and determining the color temperature of the achromatic portion. These methods, however, cannot accurately adjust the white balance due to detection errors of colors of the light sources.

As one of the most accurate white balance adjustment methods, a white balance adjustment method is available in which an achromatic object is picked up (this operation is called white sheet image pickup), a control value is obtained so as to equalize the magnitudes of color components of the picked-up image, and white balance adjustment is performed for the subsequent image pickup using the control value. This white balance adjustment method will be referred to as a manual white balance (MWB) hereinafter.

A conventional MWB control method using white sheet image pickup is shown in FIG. 11. FIG. 11 shows the conventional white balance adjustment method of partially extracting data (to be referred to white sheet data hereinafter) from an achromatic image (to be referred to as a white sheet image hereinafter) picked up by an image pickup element having a plurality of color filters, recording the extracted white sheet data on a recording medium, reading the white sheet data from the medium in the subsequent image pickup to calculate a white balance control value, and adjusting the white balance using the calculated control value.

The plurality of color filters of the image pickup element are arrays each made up of primary color filters of R, G1, G2, and B, as shown in FIG. 5. Image pickup data input from an image pickup data input terminal 1001 is processed by a main image processing unit 1002, encoding processing unit 1003, and image filing unit 1004. The processed data is recorded on a recording medium as image data by a medium-recording unit 1005.

Independently of this normal image recording process, part of the image pickup data is extracted by an image data extraction unit as MWB white sheet data. The extracted MWB white sheet data is recorded in the MWB data area of the recording medium.

When the white balance mode is set in the MWB in the subsequent image pickup, a medium-reproduction unit 1007 in the image pickup apparatus reproduces the white data recorded on the medium. A white balance control value readout unit 1008 reads out the white data. A white balance control value operating unit 1009 calculates the R, G1, G2, and B white balance control values so as to equalize the magnitudes of the average values of the R, G1, G2, and B color signals of the white data.

The white balance control values obtained by the white balance control value operating unit 1009 are set for white balance adjustment of the image pickup apparatus by a white balance control value setting unit 1010. Using the set control values, a white balance adjustment unit 1014 adjusts the white balance of the image pickup data input from an image pickup data input terminal 1013 in the subsequent image pickup. A color processing unit 1015 performs final color adjustment such as color correction processing using a color matrix. An encoding processing unit 1016 encodes the color-adjusted data into a recording format. The data output from the encoding processing unit 1016 is converted into a recording file by an image filing unit 1017. The resultant file is recorded on a recording medium 1018 as a pickup image file.

As shown in FIG. 12, in the MWB mode, a white balance control value operating unit 1102 directly calculates white balance control values from the white sheet data picked up by an image pickup apparatus (input from an image pickup data input terminal 1101). The calculated control values are set in the image pickup apparatus by a white balance control value setting unit 1103 and used as the control values in subsequent image pickup for a white balance adjustment unit 1114.

By using the set control values, the white balance adjustment unit 1114 adjusts the white balance of the image pickup data input from an image pickup data input terminal 1113 in the subsequent image pickup. A color processing unit 1115 performs final color adjustment such as color matrix conversion and color correction processing. An output from the color processing unit 1115 is encoded into a recording format by an encoding processing unit 1116. An output from the encoding processing unit 1116 is converted into a recording file by an image filing unit 1117. The resultant file is recorded on a recording medium 1118 as a pickup image file.

In the prior arts described above, however, white sheet data is written in a specific area called the MWB data area of a recording medium. The recording medium is inserted into an image pickup apparatus to read out the white data in the MWB mode. It is difficult to store a plurality of types of MWB white sheet data on one recording medium, manage them, and read out desired white data. The white data cannot be conveniently used.

The method of directly calculating the white balance control values upon picking up image pickup data and setting them in the image pickup apparatus cannot set an another MWB mode when the white data is prepared once and continuously used, resulting in inconvenience. The white data cannot be conveniently used either.

When white sheet data picked up by a given image pickup apparatus is used as white data for another image pickup apparatus in the above system, accurate white balance adjustment cannot be performed due to the influence of variations in spectral characteristics of the image pickup elements. The white sheet data cannot be conveniently used either.

SUMMARY OF THE INVENTION

The present invention has been made in consideration of the conventional problems described above, and has its object to provide an image pickup apparatus in which white sheet data used for color correction of a picked-up image can be conveniently used, a signal processing method for the image pickup apparatus, and a recording medium having a module for executing the signal processing of the signal processing method.

In order to achieve at least one of the above objects, according to an aspect of the present invention, there is provided an image pickup apparatus comprising: a memory for storing as white data first image data obtained from an image pickup element; and a control unit for converting second image data from the image pickup element into a file and storing the first image data stored the memory into an area different from that of the second image data in the image data file.

The above and other objects, features, and advantages of the present invention will be apparent from the following detailed description in conjunction with the accompanying drawings.

BRIEF DESCRIPTION OF THE DRAWINGS

FIG. 12 is a block diagram showing another prior art.

DETAILED DESCRIPTION OF THE PREFERRED EMBODIMENTS

Figure 1:
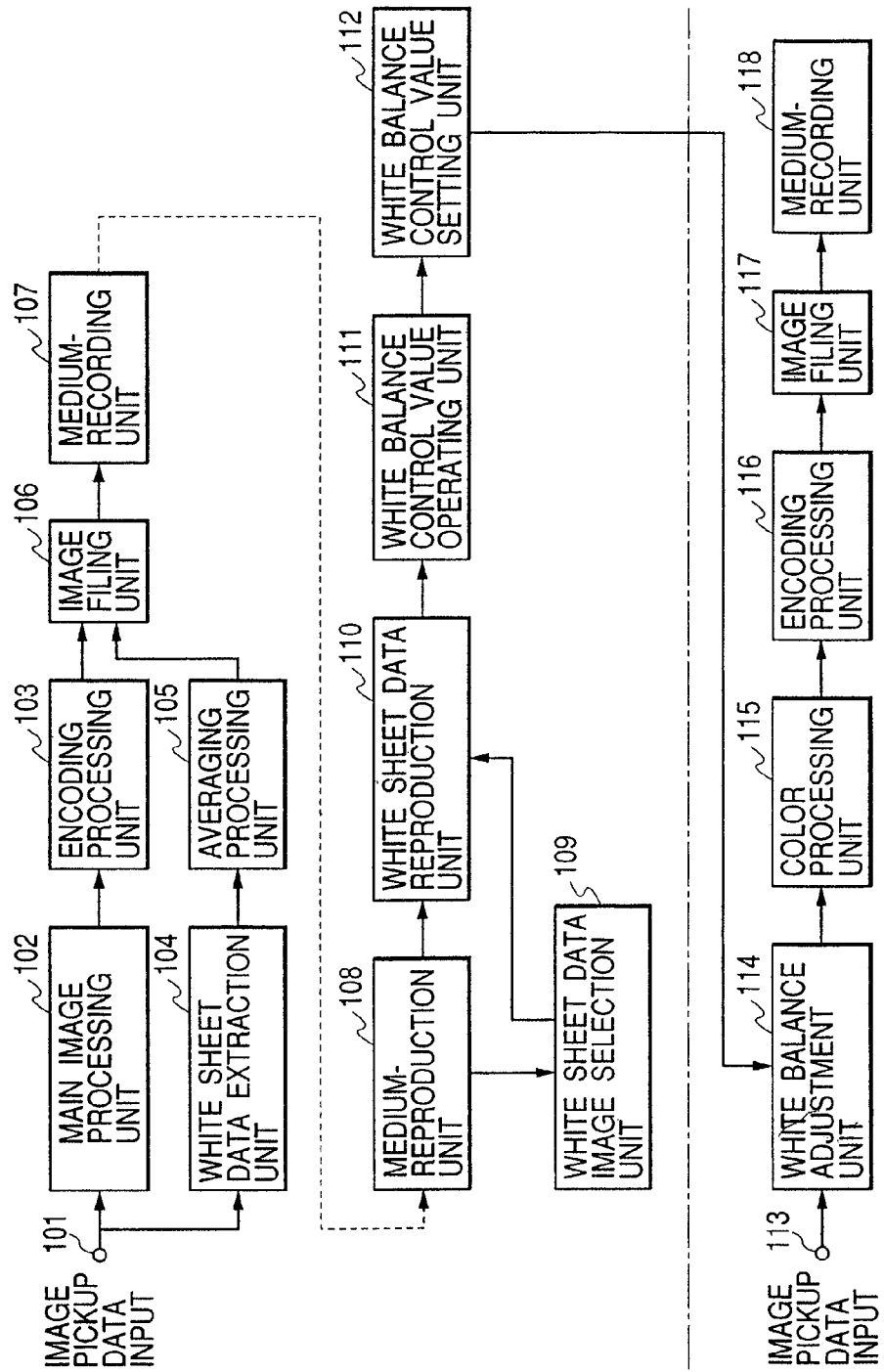
FIG. 1 is a block diagram showing the main part of an image pickup apparatus according to the first embodiment.

FIG. 1 is a block diagram showing the main part of an image pickup apparatus according to the first embodiment. This embodiment will exemplify a method of writing white image data, which is obtained by picking up the image of a white sheet in order to use it as white balance data, into an attached data area of each image file when each pickup image is recorded on a recording medium.

Referring to FIG. 1, an image pickup data input terminal 101 receives image pickup data obtained by an image pickup element having four, R, G1, G2, and B, color filters and converted into digital data.

This image pickup data is processed in a main image processing unit 102 for various image processing operations for recording with high image quality as in a digital image recording apparatus (image pickup apparatus) such as a general digital camera. The processed image pickup data is then encoded by an encoding processing unit 103 in accordance with a JPEG recording format.

Figure 9:
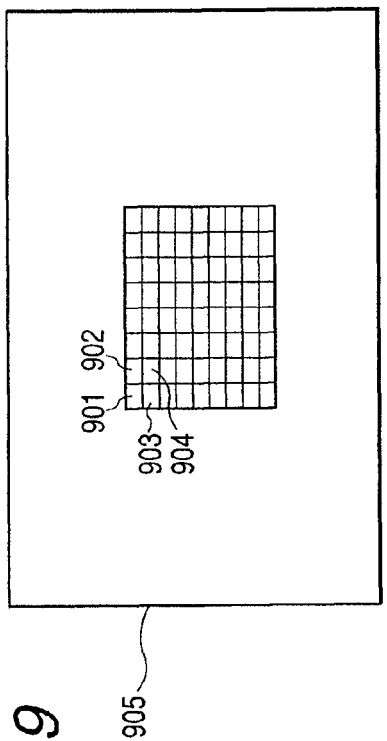
FIG. 9 is a view showing image pickup data to be extracted according to the first to fourth embodiments.

On the other hand, to obtain MWB data, the image of white sheet is picked up, and the resultant data is held as image pickup data. Part of the MWB image pickup data, e.g., pixel data of 64 pixels in the central portion of the two-dimensional image space of one picture is extracted by a white sheet data extraction unit 104, as shown in FIG. 9. An averaging processing unit 105 obtains an average value of 16-pixel data of each color component signal of R, G1, G2, or B.

An image filing unit 106 forms an image file into which the average value of the pixel data of each color component obtained as described above is converted together with image pickup data to be actually reproduced. The average value is allocated to a predetermined MWB white sheet data area attached to an image file. A medium-recording unit 107 records the average value together with the original encoded image data as one image file on a detachable recording medium such as a flash memory.

In this embodiment, since the white sheet data is obtained by extracting an image of 64 pixels in the central portion of the picture, any color image except white such as a white sheet can be picked up around the 64-pixel area. When only white image data is used, the entire picture must be set white by zooming or the like.

A technique for setting in the picked-up image white data for adjusting the white balance in the MWB mode will be described below. A medium on which an image file is recorded by the above recording scheme is loaded in the image pickup apparatus, and image reproduction is done using a user interface shown in FIG. 7.

Figure 7:
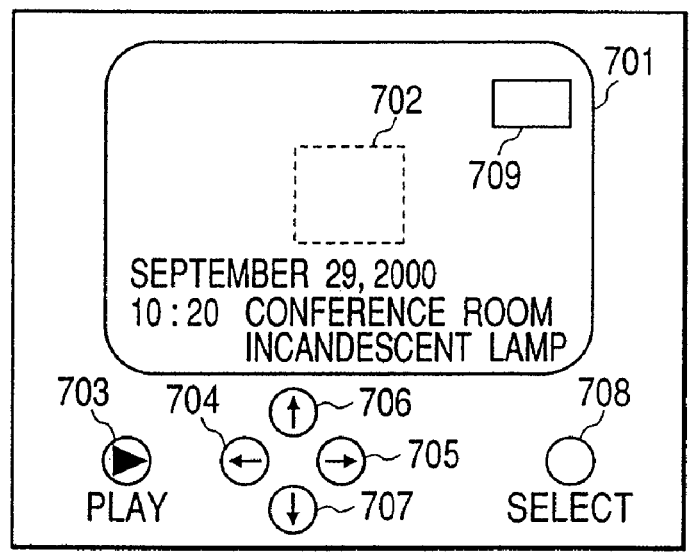
FIG. 7 is a view showing the arrangement of a user interface according to the first and second embodiments.

A PLAY button 703 shown in FIG. 7 is depressed to reproduce and display image data (image pickup data) serving as an actual reproduction target of the image file on a reproduction monitor 701.

The operator sequentially switches a plurality of files with file selection switches 704 and 705 while viewing the pickup image displayed on the reproduction monitor 701 and a white image 709 superposed on the pickup image. The operator then selects one image file obtained by picking up the image of a white sheet for white balance data.

When one image file is selected, a white sheet data reproduction unit 110 reproduces the white data on the monitor 701 on which the image serving as the reproduction target is being reproduced.

File selection is done as follows. While a file in which white data used as white balance data is written is being displayed on the monitor, a SELECT switch 708 is depressed to cause a white data image selection unit 109 to select a desired one of a plurality of files.

As indicated by the reproduction monitor 701 in FIG. 7, if the image pickup date and place are written in a location except a white data recording area 702 when intentionally picking up an image used for white balance data, operation for the white data can be further facilitated.

Reproduction processing of an image in which white image data is stored will be described below.

In accordance with an image file selection signal indicating that the file is selected, the white sheet data image selection unit 109 extracts the white sheet data of an image file being reproduced. A white balance control value operating unit 111 calculates a white balance control value on the basis of the white data, as will be described below.

White balance calculations are done as follows. The ratio of average values of R, G1, G2, and B is calculated, and the reciprocal of the ratio of R and B using the G1 and G2 average values as the median is calculated as a white balance control value WBR, WBG1, WBG2 and WBB, wherein WBR=(G1+

G2)/(2×R), WBG1=(G1+G2)/(2×G1), WBG2=(G1+G2)/(2× G2) and WBB=(G1+G2)/(2×B).

A white balance control value setting unit 112 sets the resultant white balance control value as the MWB control value in the image pickup apparatus.

When image pickup operation is performed using the MWB control value set as described above, a white balance adjustment unit 114 multiplies the set MWB control value with each color component, input from an image pickup data input terminal 113, of an image signal output from the image pickup element and converted into digital data, thereby adjusting the white balance.

The white balance-adjusted signal undergoes color processing in a color processing unit 115 and encoding processing in an encoding processing unit 116. An image filing unit 117 converts the encoded image signal into an image file together with the white sheet data extracted from the image pickup data. A medium-recording unit 118 records the image file on a recording medium.

As described above, there is provided a function of setting in the image pickup apparatus the MWB control value obtained from the white sheet data recorded together with the image pickup data in the image file. White data recorded in a plurality of scenes can easily be repeatedly used. Image pickup operation for setting an MWB control value upon a change in scene need not be done, thereby facilitating the use of MWB adjustment. Note that in this embodiment, it is described for descriptive simplicity that the image is reproduced on the monitor 701 in the image pickup apparatus, but an image file may be reproduced using, e.g., a personal computer.

As described above, according to the first embodiment, a plurality of white sheet data can be managed using one medium and accessed easily, thereby improving convenience in use of MWB white sheet data.

Figure 2:
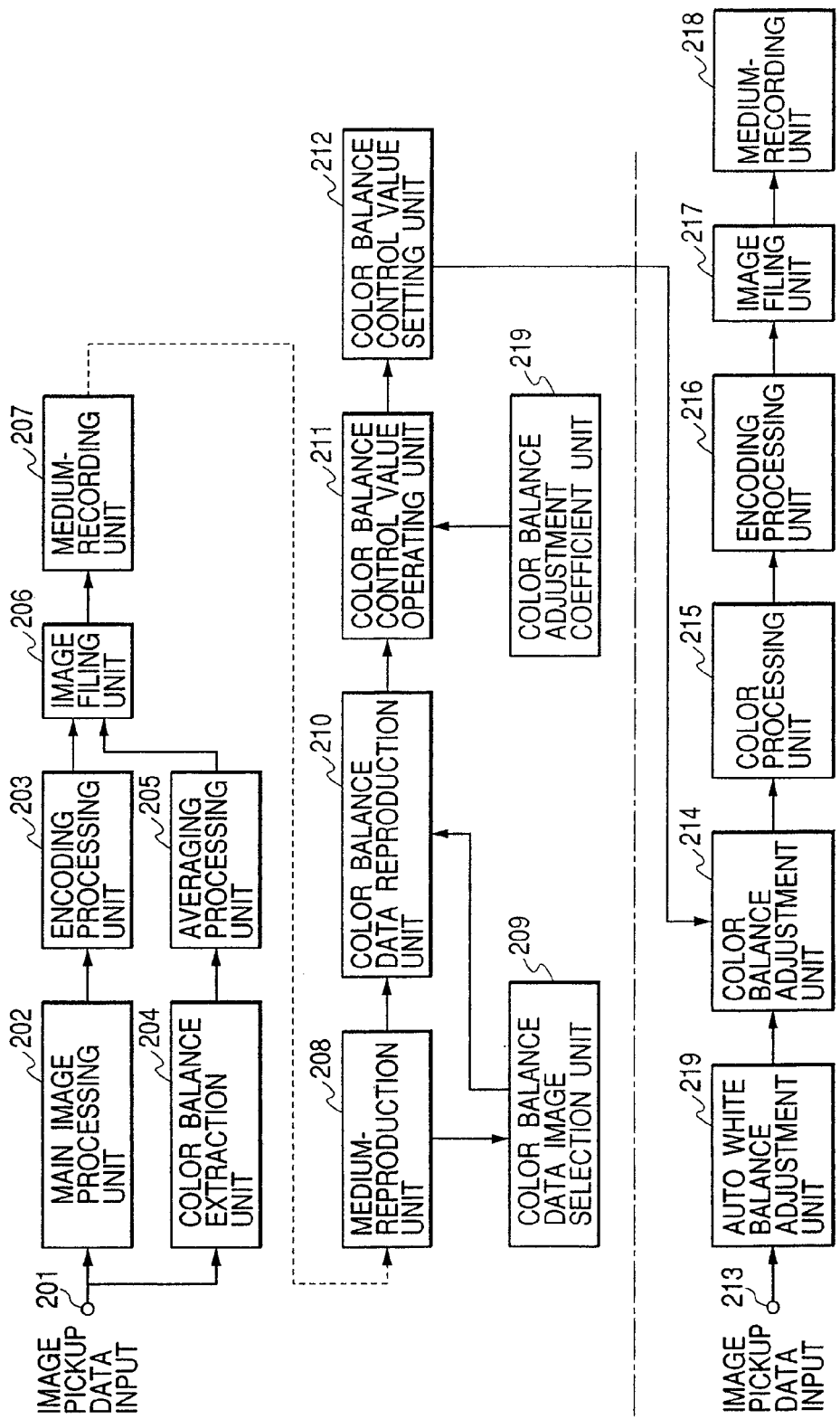
FIG. 2 is a block diagram showing the main part of an image pickup apparatus according to the second embodiment.

FIG. 2 is a block diagram showing the main part of an image pickup apparatus according to the second embodiment. This embodiment will explain a method of recording part of image pickup data as color adjustment data (to be referred to as color balance data hereinafter) of a picked-up image in a data area of each image file when recording each pickup image on a recording medium.

Referring to FIG. 2, an image pickup data input terminal 201 receives image pickup data obtained by an image pickup element having four, R, G1, G2, and B, color filters and converted into digital data.

This image pickup data is processed in a main image processing unit 202 with various image processing operations for recording with high image quality as in a digital image recording apparatus such as a general digital camera. The processed image pickup data is then encoded by an encoding processing unit 203 in accordance with a JPEG recording format.

On the other hand, part of the image pickup data, e.g., pixel data of 64 pixels in the central portion of the two-dimensional image space of one picture is extracted by a color balance data extraction unit 204, as shown in FIG. 9. An averaging processing unit 205 generates an average value of 16-pixel data of each color component signal of R, G1, G2, or B.

An image filing unit 206 forms an image file into which the resultant average value is converted together with encoded image data. The average value is allocated to a predetermined color balance data area attached to an image file. A medium-recording unit 207 records the average value together with the original encoded image data as one image file on a recording medium.

The above operation is always done in all image pickup operations including normal image pickup. Color balance image pickup is done as one of the general image pickup operations. Since color balance data is obtained by extracting an image of 64 pixels in the central portion of the picture, any color image except color balance data may be picked up around the 64-pixel area.

A technique for setting in the image pickup apparatus a color balance control value used for color balance adjustment after white balance adjustment will be described below. A medium on which an image file is recorded by the above recording scheme is loaded in the image pickup apparatus, and image file reproduction is done using a user interface shown in FIG. 7.

A PLAY button 703 shown in FIG. 7 is depressed to reproduce and display image data serving as an actual reproduction target of the image file, on a reproduction monitor 701.

The operator sequentially switches a plurality of files with file selection switches 704 and 705 while viewing the pickup image displayed on the reproduction motor 701 and an image 709 superposed on the pickup image. The operator then selects one image file to be used for color balance adjustment among a plurality of image files.

When one image file is reproduced and monitored, a color balance data reproduction unit 210 reads out and reproduces the color balance data from the attached color balance data area.

File selection is done as follows. While a file in which color balance data used for color balance adjustment is written is being displayed on the monitor, a SELECT switch 708 is depressed to cause a color balance data image selection unit 209 to select a desired file.

As indicated by the monitor 701 in FIG. 7, when the image pickup date and place are written in a location except a color balance data recording area 702 in intentionally picking up an image used for color balance adjustment, operation for the color balance data can be further facilitated.

In accordance with an image file selection signal indicating that a file is selected, the color balance data image selection unit 209 extracts the color balance data of an image file being reproduced. A color balance control value operating unit 211 calculates a color balance control value.

Color balance calculations are done as follows. The ratio of average values of R, G1, G2, and B is calculated, and the reciprocal of the ratio of R and B using the G1 and G2 average values as the median is calculated as a color balance control value.

The color balance adjustment control value can be finely adjusted (changed) in the following manner.

For example, adjustment in the R-B direction is performed using the switches 704 and 705 shown in FIG. 7. Every time the switch 704 is depressed, a color balance adjustment coefficient unit 219 outputs an R sum signal. A color balance control value operating unit 211 adds a constant to the R control value and subtracts a constant from the B control value. Every time the switch 705 is depressed, the color balance adjustment coefficient unit 219 outputs a B sum signal. The color balance control value operating unit 211 adds a constant to the B control value and subtracts a constant from the R control value.

Adjustment in the magenta-green direction is performed using switches 706 and 707 shown in FIG. 7. Every time the switch 706 is depressed, the color balance adjustment coefficient unit 219 outputs an R+B sum signal. The color balance control value operating unit 211 adds a constant to the R and B control values and subtracts a constant from the G1 and G2 control values. Every time the switch 705 is depressed, the color balance adjustment coefficient unit 219 outputs a Gr sum signal. The color balance control value operating unit 211 adds a constant to the G1 and G2 control values and subtracts a constant from the R and B control values.

The R, G, and B signals for adjusting the output signals of a monitor (not shown) can be similarly controlled by the signals from the color balance adjustment coefficient unit 219 to allow the operator to confirm the fine adjustment on the monitor.

The color balance control values obtained as described above are set in the image pickup apparatus as the color balance adjustment control values by a color balance control value setting unit 212.

As described above, when image pickup operation is performed using the color balance adjustment control values thus set, an auto white balance adjustment unit 219 adjusts the white balance of each color component of a digital image signal input from an image pickup data input terminal 213 via an image pickup element. A color balance adjustment unit 214 multiplies the set color balance control value with each color component, thereby adjusting the color balance.

For example, when an image has a uniform red portion in its center, a reddish image is output since this reddish tincture is reflected on the output image.

The color balance-adjusted signal undergoes color processing in a color processing unit 215 and encoding processing in an encoding processing unit 216. An image filing unit 217 converts the encoded image signal into an image file together with the color balance data extracted from the image pickup data. A medium-recording unit 218 records the image file on a recording medium.

As described above, there is provided a function of setting in the image pickup apparatus the color balance adjustment control value obtained from the color balance data recorded together with the image pickup data in the image file. Color balance data recorded in a plurality of scenes can be easily selected and repeatedly used. The user can freely express an image by easily changing the color tincture of the pickup image.

As described above, according to the second embodiment, color balance data recorded in a plurality of scenes can be easily selected and repeatedly used. The user can freely change the color balance of the auto white balance-adjusted pickup image. The user can freely express an image by easily changing the color tincture of the pickup image.

Figure 3:
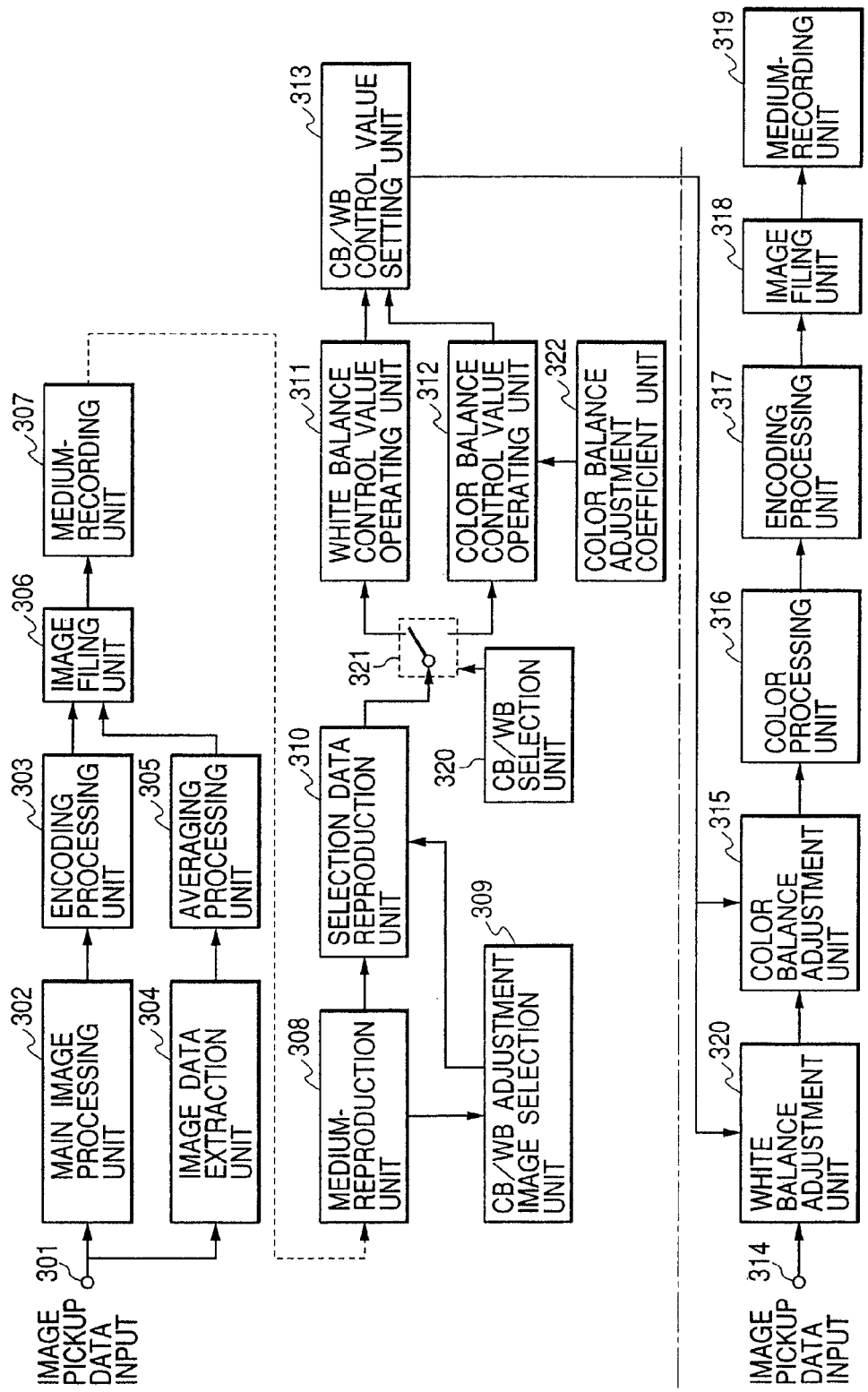
FIG. 3 is a block diagram showing the main part of an image pickup apparatus according to the third embodiment.

FIG. 3 is a block diagram showing the main part of an image pickup apparatus according to the third embodiment. This embodiment will explain a method of recording part of image pickup data as white sheet data or color balance data of a picked-up image in a data area of each image file when recording each pickup image on a recording medium, and using these data for MWB adjustment and color balance adjustment.

Referring to FIG. 3, an image pickup data input terminal 301 receives image pickup data obtained by an image pickup element having four, R, G1, G2, and B, color filters and converted into digital data.

This image pickup data is processed in a main image processing unit 302 for various image processing operations for recording with high image quality as in a digital image recording apparatus such as a general digital camera. The processed image pickup data is then encoded by an encoding processing unit 303 in accordance with a JPEG recording format.

On the other hand, part of the image pickup data, e.g., pixel data of 64 pixels in the central portion of the two-dimensional image space of one picture is extracted by an image data extraction unit 304, as shown in FIG. 9. An averaging processing unit 305 generates an average value of 16-pixel data of each color component signal of R, G1, G2, or B.

An image filing unit 306 forms an image file into which the resultant average value is converted together with encoded image data. The average value is allocated to a predetermined area attached to an image file. A medium-recording unit 307 records the average value together with the original encoded image data as one image file on a recording medium.

The above operation is always done in all image pickup operations including normal image pickup. Each of white sheet data image pickup and color balance image pickup is done as one of the general image pickup operations. Since the white sheet data and color balance data are obtained by extracting an image of 64 pixels in the central portion of the picture, any image except white sheet data and color balance data may be picked up around the 64-pixel area.

A technique for setting in the image pickup apparatus an MWB control value used for MWB adjustment and a color balance control value used for color balance adjustment will be described below. A medium on which an image file is recorded by the above recording scheme is loaded in the image pickup apparatus, and image file reproduction is done using a user interface shown in FIG. 8.

Figure 8:
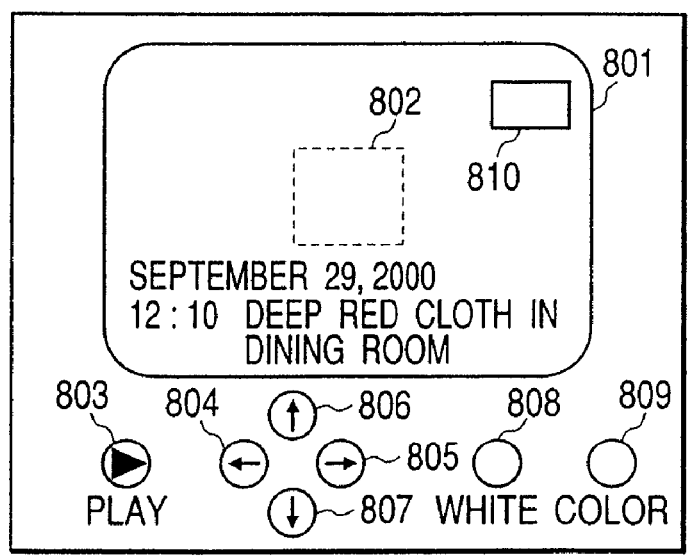
FIG. 8 is a view showing the arrangement of a user interface according to the third embodiment.

A PLAY button 803 shown in FIG. 8 is depressed to reproduce and display image data serving as an actual reproduction target (image pickup data) of the image file on a reproduction monitor 801.

The operator sequentially switches a plurality of files with file selection switches 804 and 805 while viewing the pickup image displayed on the reproduction motor 801 and a white image or color adjustment image 810 superposed on the pickup image. The operator then selects one image file to be used for white balance adjustment.

When one image file is reproduced and monitored, a selection data reproduction unit 310 reads out and reproduces the white sheet data from the attached data area.

File selection is done as follows. While a file in which white balance data used for white balance adjustment is written is being displayed on the monitor, a WHITE switch 808 is depressed to cause a CB/WB adjustment image selection unit (first selection means) 309 to select a desired file.

As indicated by the monitor 801 shown in FIG. 8, if the image pickup date and place are written in a location except a white balance data recording area 802 when intentionally picking up an image used for white balance adjustment, operation for the white sheet data can be further facilitated. This also applies to color balance adjustment to be described later.

The attached data of the image file being reproduced is selected by the CB/WB adjustment image selection unit 309 in accordance with the file selection signal indicating that a file is selected. Upon depressing the White switch 808, a switch 321 is switched in accordance with a signal from a CB/WB selection unit 320 for switching between white balance data and the color balance data. A white balance control value operating unit 311 calculates a white balance control value using the selected data.

White balance calculations are done as follows. The ratio of average values of R, G1, G2, and B is calculated, and the reciprocal of the ratio of R and B using the G1 and G2 average values as the median is calculated as a white balance control value.

The white balance adjustment control value can be set in the image pickup apparatus as the MWB adjustment control value by a CB/WB control value setting unit 313.

When the MWB control value is set in the image pickup apparatus, a color balance control value is calculated in the same manner as in the MWB control value and set in the image pickup apparatus.

The PLAY button 803 shown in FIG. 8 is depressed to cause a medium-reproduction unit 308 to reproduce and display image pickup data on a reproduction monitor 701.

The operator sequentially switches a plurality of files with file selection switches 804 and 805 while viewing the pickup image displayed on the reproduction motor 801. The operator then selects one image file desired to be used for color balance adjustment.

While the image file is reproduced and monitored, a selection data reproduction unit 310 reads out the color balance data from the attached data area and reproduces it on the monitor 701.

File selection is done as follows. While a file in which data desired to be used for color balance adjustment is being displayed on the monitor, a COLOR switch 809 is depressed to cause the CB/WB adjustment image selection unit 309 to select a desired file.

In accordance with the file selection signal indicating that a file is selected, the CB/WB adjustment image selection unit 309 selects the attached data of the image file being reproduced. Upon depressing the COLOR switch 809, the switch 321 is switched in accordance with the WB/CB selection unit 320 for switching between the white balance data and the color balance data. A color balance control value operating unit 312 calculates a color balance control value using the selected data.

Color balance calculations are done as follows. The ratio of average values of R, G1, G2, and B is calculated, and the reciprocal of the ratio of R and B using the G1 and G2 average values as the median is calculated as a color balance control value.

The color balance adjustment control value can be finely adjusted in accordance with a signal from a color balance adjustment coefficient unit 322 as in the second embodiment.

The color balance control values thus obtained are set in the image pickup apparatus by the CB/WB control value setting unit 313 as the color balance adjustment control values.

When image pickup operation is performed using the white balance adjustment control value and color balance adjustment control value set as described above, a white balance adjustment unit 320 performs MWB adjustment for each color component of a digital image signal input from an image pickup data input terminal 314 via an image pickup element, thereby adjusting the white balance.

A color balance adjustment unit 315 then performs color balance adjustment. The set color balance control value is multiplied with each color component to perform color balance adjustment.

The color balance-adjusted signal undergoes color processing in a color processing unit 316 and encoding processing in an encoding processing unit 317. An image filing unit 318 converts the encoded image signal into an image file together with the white sheet data and color balance data extracted from the image pickup data. A medium-recording unit 319 records the image file on a recording medium.

As described above, there is provided a function of setting in the image pickup apparatus the MWB adjustment control value and color balance adjustment control value obtained from the color balance data recorded together with the image pickup data in the image file. Attached data of image files recorded in a plurality of scenes can be easily selected and repeatedly used. The user can freely express an image by easily changing the color tincture of the pickup image.

More specifically, MWB white sheet data is read out to perform white balance adjustment. The same white sheet data or another white sheet data also can be read out to perform color balance adjustment. Thus, attached data of image files recorded in a plurality of scenes can be easily selected and repeatedly used. The user can freely express an image by easily changing the color tincture of the pickup image.

Figure 4:
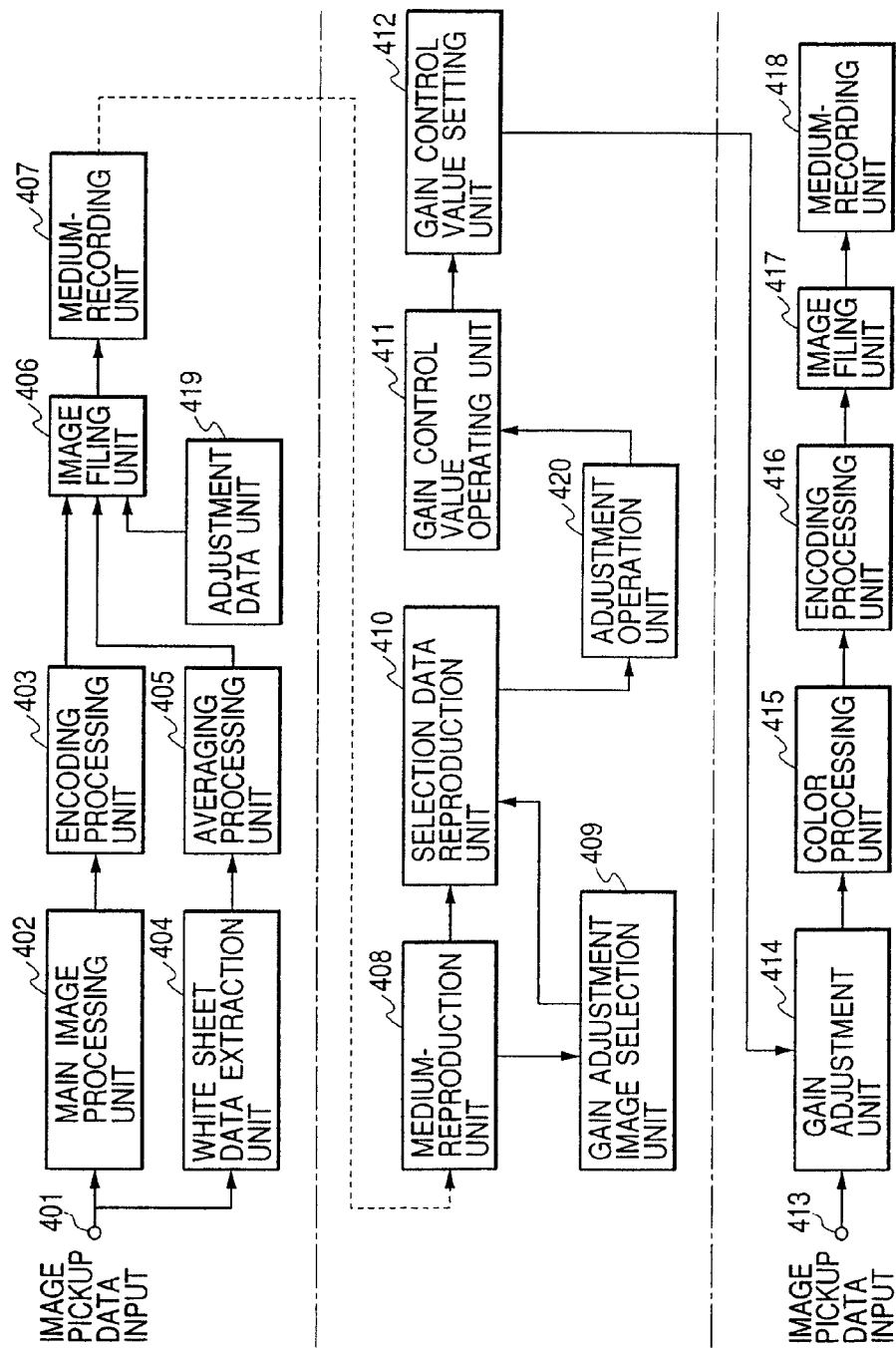
FIG. 4 is a block diagram showing the main part of an image pickup apparatus according to the fourth embodiment.
Figure 5:
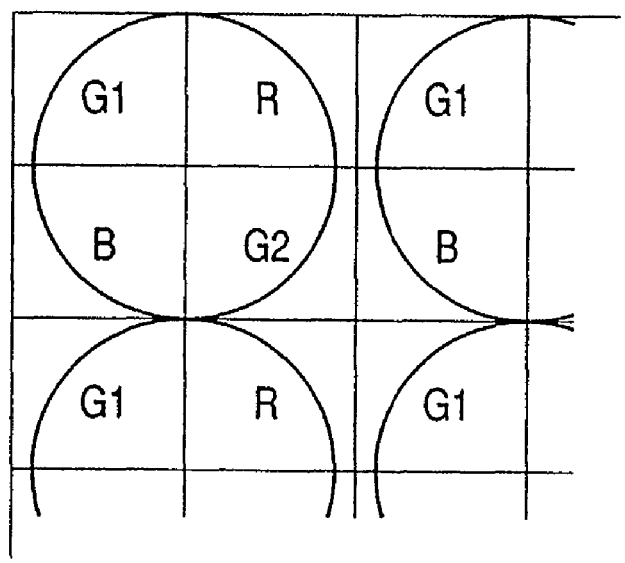
FIG. 5 is a view showing the structure of primary color filter arrays of image pickup elements.

FIG. 4 is a block diagram showing the main part of an image pickup apparatus according to the fourth embodiment. This embodiment will explain a method of recording part of picked-up image as gain control data for MWB and color balance adjustment in an attached data area of each image file, performing adjustment operation so as to use the gain adjustment data in any image pickup apparatus and perform MWB adjustment and color balance adjustment in recording each pickup image on a recording medium.

A method of extracting some data from image pickup data and recording the extracted data as data for MWB or color balance adjustment in an attached area of each image file is the same as in the first embodiment, and a detailed description thereof will be omitted.

According to the characteristic feature of the fourth embodiment, image pickup element fluctuation adjustment data recorded in an image pickup element fluctuation adjustment data recording area (memory) or adjustment data unit 419 of this image file as data obtained by picking up images of a white sheet under each of two different specific light sources are recorded in a specific part of the attached area.

Figure 10:
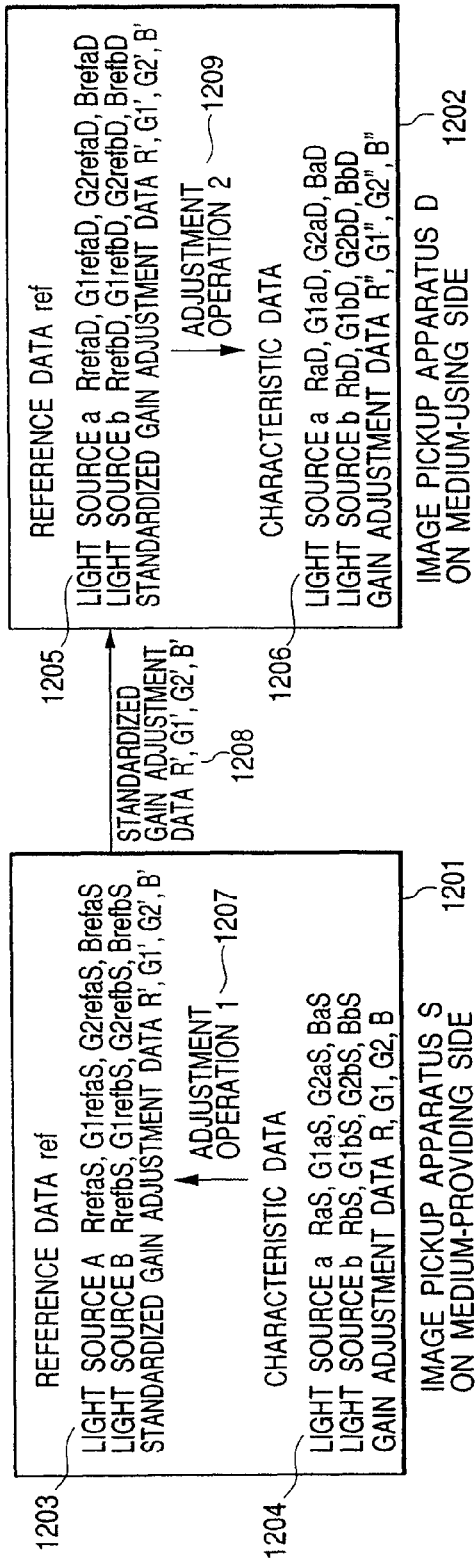
FIG. 10 is a view for explaining the order of operation for adjusting variations in image pickup elements according to the fourth embodiment.
Figure 11:
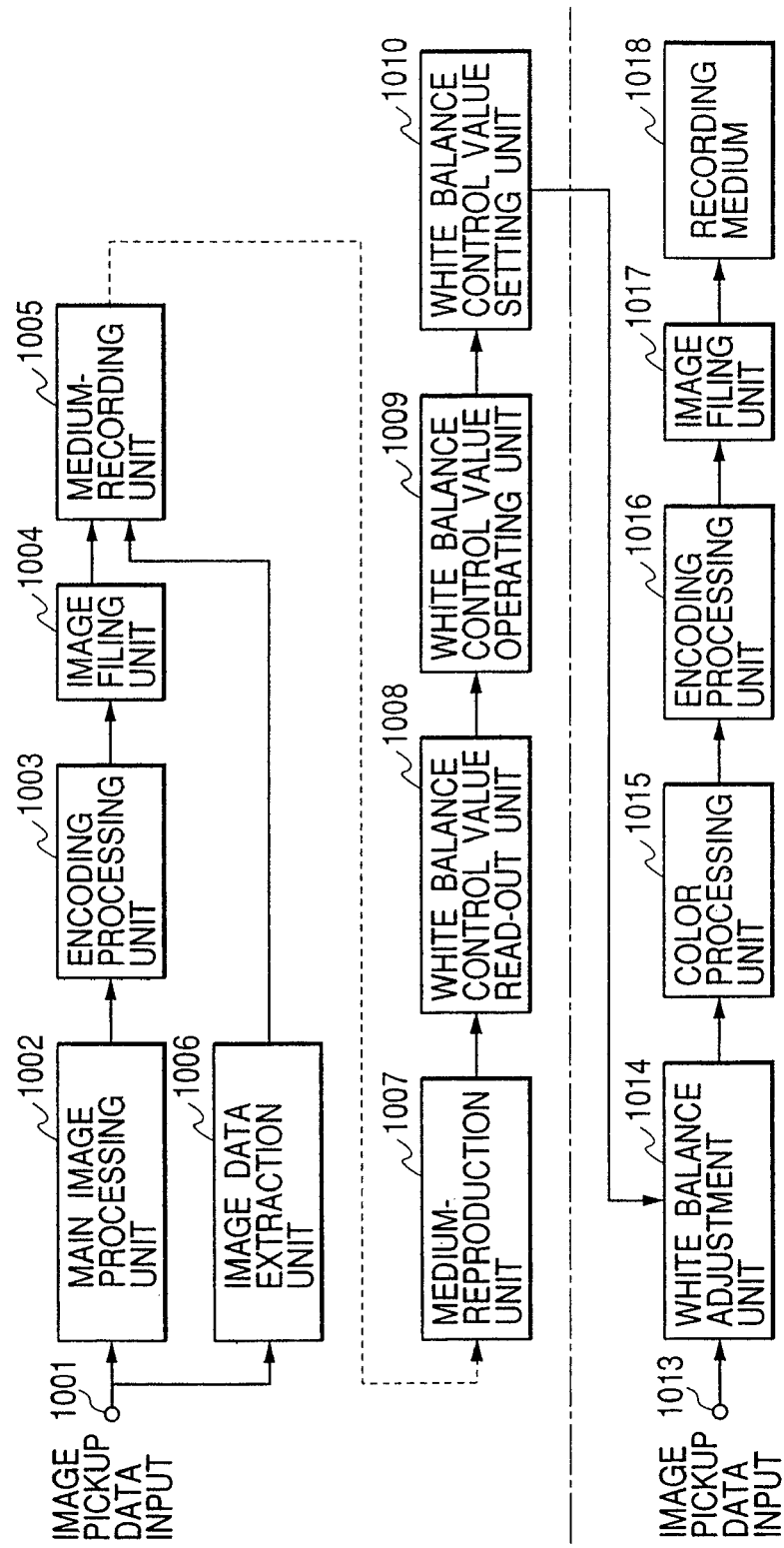
FIG. 11 is a block diagram showing a prior art.

Image pickup element fluctuation adjustment data, i.e., image pickup data 1203 and 1205 of two different light sources obtained by using a reference image pickup apparatus shown in FIG. 10 and image pickup data 1204 and 1206 of two different light sources unique to each image pickup apparatus for each color component of R, G1, G2, or B, are recorded by the adjustment data unit 419 in the area attached to the image file. This embodiment uses two different light sources. However, adjustment precision is improved when the number of types of light sources increases. Although the adjustment precision is not improved so much, the image pickup element fluctuation adjustment can be also attained by using only one kind of light source.

These image pickup element fluctuation adjustment data which is written in the memory of each image pickup apparatus at the time of shipment, are read out by a readout means (not shown) in each image pickup operation and then written in a single file together with the MWB white sheet data and color balance data.

The average value of all or some image pickup data for each color component of R, G1, G2, or B, obtained when picking up the image of a light source, is used as such image pickup element fluctuation adjustment operation data.

As in the above three embodiments, when the attached data of a file selected by a selection data reproduction unit 410 shown in FIG. 4 is read out, the fluctuation adjustment data are also read out and reproduced.

An adjustment operation unit 420 adjusts these fluctuation adjustment data in the following manner and supplies the resultant data as R, G1, G2, and B data for MWB or color balance adjustment to a gain control value operating unit 4111. The gain control value operating unit 4111 calculates gain control values for MWB and color balance adjustment.

Referring to FIG. 10, an image pickup apparatus 1201 records MWB and color balance adjustment data on a medium. An image pickup apparatus 1202 reads out the MWB and color balance gain adjustment data recorded on the recording medium and performs gain adjustment.

Fluctuation adjustment between the image pickup elements in an image pickup apparatus is two-dimensionally performed using ratios R/B and (R+B)/(G1+G2) of reference data Rrefa, G1$refa$, G2$refa$, Brefa of a light source a, reference data Rrefb, G1$refb$, G2$refb$, and Brefb of a light source b, and data Ra, G1$a$, G2$a$, and Ba of the light source a, and data RbS, G1$b$S, G2$b$S and BbS of the light source b which are unique to the image pickup apparatus.

The method of fluctuation adjustment calculation between the image pickup elements in an image pickup apparatus can be expressed by a difference such as an (R−B) value or (R+B)−(G1+G2) value. Any mathematical expression can be used if it can be expressed so as to absorb fluctuations between the image pickup elements in the image pickup apparatus.

First of all, the relationship between the reference data RrefaS, G1$refa$S, G2$refa$S, BrefaS, RrefbS, G1$refb$S, G2$refb$S, and BrefbS (1203) read out from a given recording medium and adjustment data RaS, G1$a$S, G2$a$S, BaS, RbS, G1$b$S, G2$b$S, and BbS (1204) unique to the image pickup apparatus and recorded on the given recording medium is adjusted using MWB and color balance gain adjustment data R, G1, G2, and B read out from the given recording medium.

Gain values and offset values of the difference between the R/B ratios and (R+B)/(G1+G2) ratios of the light sources a and b are obtained:

$$GainRB = \{(RrefaS/BrefaS) - (RrefbS/BrefbS)\} / \{(RaS/BaS) - (RbS/BbS)\} \quad (1)$$

$$OffsetRB = (RrefaS/BrefaS) - GainRB * (RaS/BaS) \quad (2)$$

These are reflected on the gain adjustment data.

$$(R'/B') = GainRB * (R/B) + OffsetRB \quad (3)$$

Similarly, the following relations are obtained for the (R+B)/(G1+G2) ratios:

$$GainRBG1G2 = \{(RrefaS + BredfaS)/(G1refaS + G2refaS) - (RrefbS + BrefbS)/(G1refbS + G2refbS)\} / \{(RaS + BaS)/(G1aS + G2aS) - (RbS + BbS)/(G1bS + G2bS)\} \quad (4)$$

$$OffsetRBG1G2 = \{(RrefaS + BrefaS)/(G1refaS + G2refaS)\} - GainRBG1G2 * \{(RaS + BaS)/(G1aS + G2aS)\} \quad (5)$$

$$(R' + B')/(G1' + G2') = GainRBG1G2 * \{(R + B)/(G1 + G2)\} + OffsetRBG1G2 \quad (6)$$

These equations yield data R', G1', G2' and B' converted into reference data for the image pickup apparatus which recorded the data on the medium. The resultant data is given by adjustment operation (1) 1207 shown in FIG. 10.

Now assuming that G1' and G2' are fixed values respectively such as G1'=G1$refb$S and G2'=G2$refb$S, R' and B' can be calculated from the equations (3) and (6) which calculate R'/B' and (R'+B')/(G1'+G2') respectively. The thus-obtained R', G1', G2' and B' are written by the image filing unit 406 into a file same as the image file as reference white sheet data for MWB. A procedure 1208 is a processing method of transferring the white sheet data for MWB to an other image pickup apparatus D 1202 through the image file thus-recorded on the recording medium.

Next, a method of setting the white sheet data for MWB to the image pickup apparatus D 1202 will be explained. Since the MWB white sheet data R', G1', G2' and B' are read out from the recording medium as reference white sheet data for MWB, an operation 2 which adjusts data whose characteristic is suitable for the image pickup apparatus D 1202 is performed using reference data 1205 and specific data 1206 of light sources a and b of the image pickup apparatus D 1202. The adjustment operation is performed to calculate gain value and offset value of difference in a ratio R/B and a ratio (R+B)/(G1+G2) between the light source a and the light source b, wherein $$GainRB' = \{(RaD/BaD) - (RbD/BbD)\} / \{(RrefaD/BrefaD) - (RrefbD/BrefbD)\} \quad (7)$$

$$OffsetRB' = (RaS/BaS) - GainRB'*(RrefaS/BrefaS) \quad (8)$$

These results are reflected on gain adjustment data, that is, $$R''/B'' = GainRB'*(R'/B') + OffsetRB' \quad (9)$$

In the same manner, a calculation as to the ratio (R+B)/(G1+G2) is performed as follows:

$$GainRBG1G2' = \{(RaD + BaD)/(G1aD + G2aD) - (RbD + BbD)/(G1bD + G2bD)\} / \{(RrefaD + BrefaD)/(G1refaD + G2refaD) - (RrefbD + BrefbD)/(G1refbD + G2refbD)\} \quad (10)$$

$$OffsetRBG1G2' = \{(RaS + BaS)/(G1aS + G2aS)\} - GainRB' * \{(RrefaS + BrefaS)/(G1refaS + G2refaS)\} \quad (11)$$

$$(R'' + B'')/(G1'' + G2'') = GainRBG1G2' * \{(R' + B')/(G1 + G2')\} + OffsetRBG1G2' \quad (12)$$

Now assuming that G1 and G2' are fixed values respectively such as G1'=G1$b$D and G2'=G2$b$D, R'' and B'' can be calculated from the equations (3) and (6) which calculate R''/B'' and (R''+B'')/(G1''+G2'') respectively. These R'', G1'', G2'' and B'' are set as the white sheet data for MWB.

The R'', G1'', G2'', and B'' values thus obtained represent values which absorb fluctuations between the image pickup elements in the image pickup apparatuses 1201 and 1202 upon converting the data of the image pickup apparatus 1201 (medium-providing-side image pickup apparatus S) into data of the image pickup apparatus 1202 (medium-use-side image pickup apparatus D).

The gain adjustment control value operation unit 411 calculates the ratio of R'', G1'', G2'', and B'' from the values obtained by the arithmetic operations (1) and (2) and obtains the MWB and color balance adjustment control values WBR, WBG1, WBG2 and WBB, wherein WBR=(G1''+G2'')/(2×R''), WBG1=(G1''+G2'')/(2×G1''), WBG2=(G1''+G2'')/(2×G2'') and WBB=(G1''+G2'')/(2×B''). Then, the gain control value setting unit (setting means) 412 performs settings.

Using the gain adjustment control values thus set, the gain adjustment unit 414 performs MWB or color balance adjustment in the subsequent image pickup. The data are converted into an image file as in the above embodiments. The resultant data is recorded on a recording medium by a medium-recording unit 418.

By the above method, data written in the specific area attached to the image file used for MWB and color balance adjustment is adjusted for fluctuations using the image pickup element fluctuation adjustment operation data of the image pickup apparatus, written in the same specific area. Thus, as long as identical light sources are used, the same R, G, G1, and B values are obtained even when different image pickup apparatus are used. Therefore, data fluctuations between the image pickup apparatuses can be absorbed.

As described above, even if MWB or color balance control values are obtained using the white sheet data or color balance adjustment data of image files picked up using different image pickup apparatuses, optimal (accurate) MWB or color balance adjustment operation can be done.

According to the fourth embodiment, as described above, white balance adjustment or color balance adjustment using white sheet data can be accurately done in an image pickup apparatus different from that by which the white sheet data are obtained.

Figure 6:
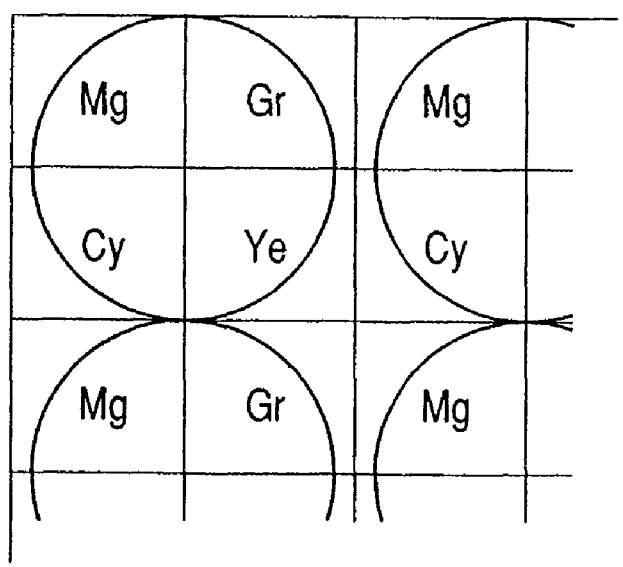
FIG. 6 is a view showing the structure of complementary color filter arrays of image pickup elements.

In the first to fourth embodiments, the colors of the color filters of the image pickup element are R, G1, G2, and B. However, the present invention is also applicable to complementary color filters of Mg (magenta), Gr (green), Cy (cyan), and Ye (yellow) components, as shown in FIG. 6.

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes therefore constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, program codes corresponding to the flow chart described above are stored in the storage medium. Briefly speaking, modules indispensable to the image pickup apparatus of each embodiment described above are stored in the storage medium.

As has been described above, according to the present invention, convenience of the white sheet data used for color correction of a picked-up image can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    an extracting unit constructed to extract information for white balance calculation from first image data obtained from an image pickup element, wherein the extracted information for white balance calculation includes calculation values corresponding to each of colors from the first image data;
    a storing unit constructed to store a plurality of files in a memory, wherein the plurality of files include the first image data obtained from the image pickup element and the extracted information for white balance calculation including the calculation values corresponding to each of colors from the first image data;
    a display unit which displays information of at least one of the plurality of files including the first image data and the extracted information for white balance calculation, wherein the display information includes at least one of the first image data and attribute data of the first image data;
    a selection member constructed to accept selection of a file from the plurality of files including the first image data of which information is displayed on the display unit; and
    a calculation unit constructed to calculate a white balance setting parameter for second image data by using the extracted information for white balance calculation of the first image data included in the file selected by the selection member, wherein the second image data is new image data which is picked up after said selection member selects the file.

2. The image pickup apparatus according to claim 1, wherein the extracted information for white balance calculation is specified after the image pickup operation for the first image data is implemented in accordance with a predetermined setting.

3. The image pickup apparatus according to claim 1, wherein the selection member is disposed on a surface of the image pickup apparatus.

4. The image pickup apparatus according to Claim 1, wherein the calculation values are average pixel values corresponding to each of pixel colors from a center area of the first image data.

5. The image pickup apparatus according to Claim 1, further comprising an adjusting unit constructed to adjust a white balance of the second image data obtained from the image pickup element, in accordance with the calculation by the calculation unit.

6. The image pickup apparatus according to claim 5, further comprises a control unit which controls storage of the second image data adjusted by the adjusting unit as a file different from the files of the first image data.

7. A control method of an image pickup apparatus including an image pickup element and a display unit, comprising the steps of:
    extracting information for white balance calculation from first image data obtained from the image pickup element, wherein the extracted information for white balance calculation includes calculation values corresponding to each of colors from the first image data;
    storing a plurality of files in a memory, wherein the plurality of files include the first image data obtained from the image pickup element and the extracted information for white balance calculation including the calculation values corresponding to each of colors from the first image data;
    displaying, on the display unit, information of at least one of the plurality of files including the first image data and the extracted information for white balance calculation, wherein the display information includes at least one of the first image data and attribute data of the first image data;

accepting selection of a file from the plurality of files including the first image data of which information is displayed on the display unit; and calculating a white balance setting parameter for second image data by using the extracted information for white balance calculation of the first image data included in the file selected in the selection accepting step, wherein the second image data is new image data which is picked up after the selection accepting step accepts the selection of the file.

8. The method according to Claim 7, wherein the calculation values are average pixel values corresponding to each of pixel colors from a center area of the first image data.

9. The method according to Claim 7, further comprising adjusting a white balance of the second image data obtained from the image pickup element, in accordance with the calculation in the calculation step.

* * * * *